No. 715,581. Patented Dec. 9, 1902.
J. M. HOGARTH.
WATER FEEDING AND SCALE REMOVING DEVICE FOR STEAM BOILERS.
(Application filed Apr. 28, 1902.)
(No Model.)
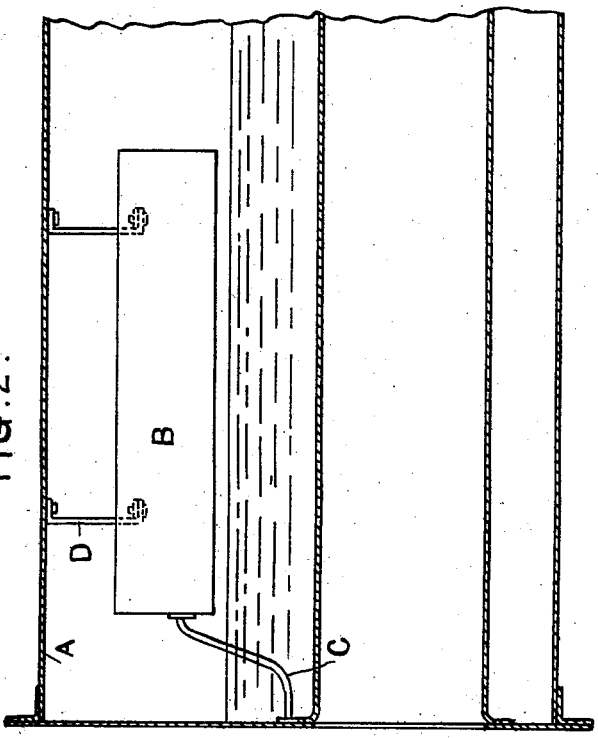
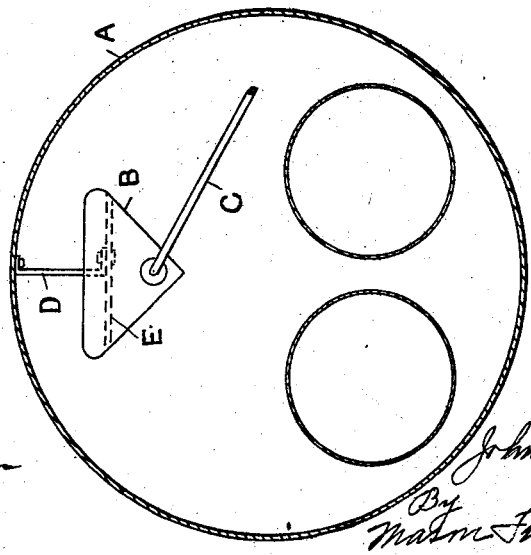

UNITED STATES PATENT OFFICE.

JOHN MELLRAY HOGARTH, OF BOOTLE, ENGLAND, ASSIGNOR OF ONE-HALF TO REGINALD WALTER PRESTON, OF CLARE LODGE, WALLASEY, CHESTER COUNTY, ENGLAND.

WATER-FEEDING AND SCALE-REMOVING DEVICE FOR STEAM-BOILERS.

SPECIFICATION forming part of Letters Patent No. 715,581, dated December 9, 1902.

Application filed April 28, 1902. Serial No. 105,075. (No model.)

*To all whom it may concern:*

Be it known that I, JOHN MELLRAY HOGARTH, distillery manager, a subject of the King of Great Britain, residing at Bootle, in the county of Lancaster, in the Kingdom of England, (whose full postal address is 20 Pembroke road, Bootle aforesaid,) have invented certain new and useful Improvements in Water-Feeding and Scale-Removing Devices for Steam-Boilers, (for which application for a patent has been made in Great Britain, No. 8,975, dated April 17, 1902,) of which the following is a specification.

This invention relates to devices for feeding steam-boilers of any type, and has for its object to arrange the inflow of water so that the scale of fur may be deposited therefrom on plates specially arranged for the purpose or before the water reaches the flue-surfaces, whereby the formation of fur on the flues and other parts of the boiler itself is prevented.

In the accompanying drawings, Figure 1 is a cross-section of a boiler with my apparatus applied thereto; Fig. 2, a longitudinal section.

A is the boiler, to which I apply inside a trough B of about one-eighth the length of the boiler. This is supported or hung inside the boiler above the normal high-water level. The walls of this trough B are preferably V-shaped, though they may be rounded, if preferred; but the walls must be sloped inward at such an angle that water overflowing the top of the trough will cling to the walls and flow down them to the center and finally falling into the water of the boiler along the center line of the latter. I have found that this action takes place best when the upper edges of the trough are somewhat rounded inward.

C is the feed-water pipe for supplying this trough with water. The water is fed constantly and regularly to the trough; otherwise the overflow of the feed-water is not sufficiently regular for it to cling to the trough-wall in a sheet, as required. The feed-water is fed by means of a pump, which is adjusted so as to regularly supply as nearly as possible the required amount of water to maintain the proper level in the boiler, the pipe C from the pump being by preference carried through the water in the boiler and discharged into the trough B near the bottom, preferably at one end. The trough is suspended by means of hangers D, bolted to the boiler-top and to cross-bars E, connecting the opposite sides of the trough.

The action of the device is as follows: The entering water is heated practically up to boiling temperature in the trough B, as the latter is in the steam-space or hottest zone of the boiler, and consequently the salts which are deposited from the water at the boiling temperature are thrown down as a sort of precipitate in the water near the top of this trough, and as the overflow takes place the scale is largely deposited on the outer walls of the trough owing to the way in which the water clings to them in falling. Any of the sediment which may not collect on these plates falls to the bottom of the boiler and may be removed when desired through the mud-hole. Thus it will be seen that practically all the scale is deposited from the water before it comes into contact with the flues, and consequently practically no deposit takes place on the latter or on the sides of the boiler itself.

The invention though shown applied to a Lancashire boiler can be applied to a boiler of any other type.

I declare that what I claim is—

1. A feed-water mechanism for boilers, comprising a trough triangular in cross-section suspended in the steam-space of a boiler, means for introducing water into the said trough at the lower part thereof, in such manner that the water shall rest in the trough and run down the inclined sides of the said trough when overflowing the same, horizontally-arranged braces connecting the interior walls of the said trough and vertical rods connecting said braces with the wall of the boiler, whereby the trough is supported in position, substantially as set forth.

2. A scale-preventing device for steam-boilers, comprising an elongated trough having its longitudinal sides tapered downward for the greater portion of its depth, the upper edges of said sides being curved inwardly, means for introducing feed-water into the bottom of the trough, bars extending across the interior of the trough, rods connecting said bars with the wall of the boiler, thus supporting the trough in position, the curved upper edge of the trough tending to cause the water when overflowing said trough to run down the sides thereof, and the tapering arrangement of said sides causing the water to drop from the bottom central portion of said trough, substantially as set forth.

3. A scale-preventing device for steam-boilers, comprising a trough suspended in the steam-space of a boiler and provided with a longitudinally-extending ridge along the bottom thereof, tapering sides leading thereto from the open top of the trough, and means for introducing feed-water in the trough, the tapering sides causing the water to run downwardly to the ridge at the bottom of the trough before dropping into the boiler so that scale or foreign substances will be deposited on the sides of the trough, substantially as described.

In witness whereof I have hereunto signed my name, this 19th day of April, 1902, in the presence of two subscribing witnesses.

JOHN MELLRAY HOGARTH.

Witnesses:
G. C. DYMOND,
F. P. EVANS.